United States Patent [11] 3,609,021

| [72] | Inventor | Ernst Gill |
| | | Ludwigstrasse 8, Saarlouis, Germany |
| [21] | Appl. No. | 847,554 |
| [22] | Filed | Aug. 5, 1969 |
| [45] | Patented | Sept. 28, 1971 |
| [32] | Priority | Aug. 8, 1968 |
| [33] | | Germany |
| [31] | | P 17 97 048.8 |

[54] CASETTES FOR STORING AND PROJECTING A FILM
10 Claims, 4 Drawing Figs.

[52] U.S. Cl. .................................................. 352/78,
226/74, 226/172, 242/199, 352/83
[51] Int. Cl. ....................................................... G03b 23/02
[50] Field of Search ........................................... 352/1,
15–17, 26–33, 72, 78, 83, 92, 124, 125, 173;
226/74, 172; 242/198–200, 75.5

[56] References Cited
UNITED STATES PATENTS

| 2,012,208 | 8/1935 | Wildy | 242/75.5 X |
| 2,453,031 | 11/1948 | Olds, Jr. | 226/74 |
| 2,624,232 | 1/1953 | Kingston | 352/72 |
| 2,681,591 | 6/1954 | Nyman | 352/31 |
| 3,136,207 | 6/1964 | Flad et al. | 352/72 |
| 3,248,164 | 4/1966 | Wells | 352/83 X |
| 3,459,472 | 8/1969 | Husted et al. | 352/124 X |
| 3,490,833 | 1/1970 | Gottschalk et al. | 352/72 |

Primary Examiner—Donald O. Woodiel
Attorney—Fleit, Gipple & Jacobson

ABSTRACT: A cassette adapted for storing a perforated film having at least two mutually parallel series of images which can be reproduced in opposite directions of advance so that the film may be projected by a cinema projector. The cassette comprises a casing having a plurality of connected walls, one of the walls comprising a baseplate with bushings for aligning one of the series of images at a time with the optical projection axis of the projector. A plurality of magazines are carried by the baseplate on opposite sides of the projection axis with each of the magazines being adapted for receiving and storing the film. A first sprocket drive is connected to the baseplate for advancing the film through the area of projection axis with a second sprocket drive connected to the baseplate for feeding the film through the first sprocket drive. At least one transfer sprocket is positioned between the first and second sprocket drives with each transfer sprocket comprising parallel first and second discs spaced relative to one another. The discs have toothlike projections on their outer periphery for engagement in the perforations along the margins of the film and are mounted independently of each other in opposite cassette walls so that they are coaxially arranged and dimensioned as to lie to each side of the projection axis outside the picture area of the film in all operative positions of the cassette. The first disc has a shaft engaging it with the shaft extending through the baseplate and having a driving disc at its free end outside the baseplate cassette casing wall.

3,609,021

CASETTES FOR STORING AND PROJECTING A FILM

BACKGROUND OF THE INVENTION

In cinemas, feature films are projected by at least two projectors which each project a reel of film in turn. The image and sound are faded over from one projector to the other to give the impression of continuous projection. With this projection technique, an operator must insert new reels in the projectors alternately, and when a finished reel is taken out it must be wound back for the next performance. If there are four performances per day, the projectionist must insert reels of film in the projectors some 30 or 40 times, each time threading the film into the feed sprockets, aligning it with the projection axis and taking out the reels. As a result of the electrostatic charge on the film material, the film and feed sprockets must be cleaned fairly frequently. During these operations there is a risk that the film material will be damaged by clumsy handling, and in particular that the highly sensitive surfaces of the film will be scratched or the like. Also, the perforations provided along the margins for the purpose of feeding the film may be damaged. In order to reduce the frequent changing of reels of film, very large storage spools have been proposed, which will take a complete motion picture (for example, 4,000 meters of film). However, these spools are extremely cumbersome and are not suitable for transport. They require suitably enlarged projectors, and the films must be wound back on special apparatus, often taking more time than is available, for example, during continuous performances. Since such large reels are difficult to transport, it has also been proposed that the film should be stored on small reels for transport and rewound onto a large reel before being projected in the cinema, the separate lengths of film being stuck together with adhesive. This, again, requires trained operators, who are often not available, especially in small cinemas.

The feed means in known cinema projectors consist of two feed sprockets which rotate continuously and between which, forming a loop of film, a transfer sprocket is provided. This transfer sprocket has a maltese-cross-drive and feeds the film intermittently through the picture gate. Two toothed rims on the transfer sprocket engage corresponding recesses at the margin of the film, but, since only about two teeth engage the film at a time, the film is easily damaged, since the intermittent advancing forces stress the film material unevenly and cause rapid wear. If pressure shells are used, more teeth will engage the film at a time, but the film will be bent back at the edges of the curved shells and this also will cause rapid wear of the film material. In the case of particularly thin films, for example polyester-based films, the known feed apparatus is not satisfactory.

SUMMARY OF THE INVENTION

This invention relates to cassettes for storing a film and for projecting by means of a cinema projector and; more particularly, to novel means enabling the storing of whole evening's program for automatic projection, i.e. without any operator being required.

The further object is to obviate the disadvantages of the known apparatus and also, in particular, to protect thin film material from damage. Instead of the film being inserted in the projector by hand, it will be brought by a simple operation into the operative position. In this position a whole program, even of a week or a month, may be projected automatically. No projected length of film is to be rewound.

In accordance with the invention a cassette is designed to take a film having at least two mutually parallel series of images which are to be reproduced in opposite directions of advance. The cassette is formed with means for aligning one series of images at a time with the optical projection axis.

Preferably each series of images is associated with a sound track which can be scanned optically, magnetically or in a similar fashion and can be transferred into the operative position together with the associated series of images.

It is a further object of the invention to provide a cassette which completely encloses the film and the transferring means thereof providing safe protection for the film material. For this purpose the baseplate is provided with two magazines for receiving the film, feed sprockets for advancing the film, and bores by means of which the cassette is slidably mounted on pins in a transverse direction relative to the projection axis.

Conventional continuously rotating feed sprockets are provided on those sides of the magazines facing the projection axis and are engaged by freely rotating pinch rollers.

Yet another object of the invention is to feed the film gently in the region of the optical axis, which is achieved by two transfer sprockets being arranged between the feed sprocket systems, and which are each driven by a maltese-cross-drive and are connected to one another by two endless transfer belts so dimensioned and disposed that they lie to each side of the projection axis outside the picture area in all operative positions of the cassette.

A roller is provided on that side of each transfer sprocket which is remote from the projection axis, and two endless belts, parallel to the transfer belts run over these two rollers. The transfer belts bear toothlike projections which engage in the corresponding recesses in the further belts, gripping the film. The film is therefore guided precisely over a fairly long distance, and the advancing forces act on numerous places on the film.

A further object of the invention is to replace the flexible transfer belts by a rigid surface carrying the projections for the engagement with the film. Therefore, between the systems of continuously rotating feed sprockets there are two coaxial transfer sprockets, so dimensioned and arranged that they lie laterally to each side of the projection axis outside the picture area in all operative positions of the cassette. The transfer sprockets are parallel discs spaced relative to one another and have toothlike projections for engagement in the perforations along the margins of the film. Both discs are mounted independently of one another in the cassette walls, the shaft of one disc extending through the cassette casing wall and having a driving disc at its free end.

Yet another object of the invention is to provide a device for the alignment of the cassette relative to the optical axis, i.e. to displace it relative to the projector, comprising at least two pins which are provided on the the projector and/or intermediate drive —if any —and the cassette is slidably mounted on these pins by means of bushings, the length of the pins being such that all the series of images on the film stored in the cassette can be brought into the optical axis. For this purpose, also, the baseplate is provided with a control means, such as a control magnet, having a plurality of positions, and this control means engages a fixed surface on the projector and/or intermediate drive by means of a permanent magnet or the like and so fixes the position of each series of images in the projection axis. The control means have as many positions as there are parallel series of pictures on the film.

An automatic projection of the film is ensured in accordance with the requirements of the invention by the film and/or the sound track bearing markings for actuating a sensor which initiates operation of the control means, reversing of the projector, and similar control processes. A sensor may be provided in the vicinity of one or of each transfer sprocket.

For an understanding of the principles of the invention, reference is made to the following description of typical embodiments thereof as illustrated in the accompanying drawings.

DESCRIPTION OF THE PREFERRED EMBODIMENTS

Figure 1:
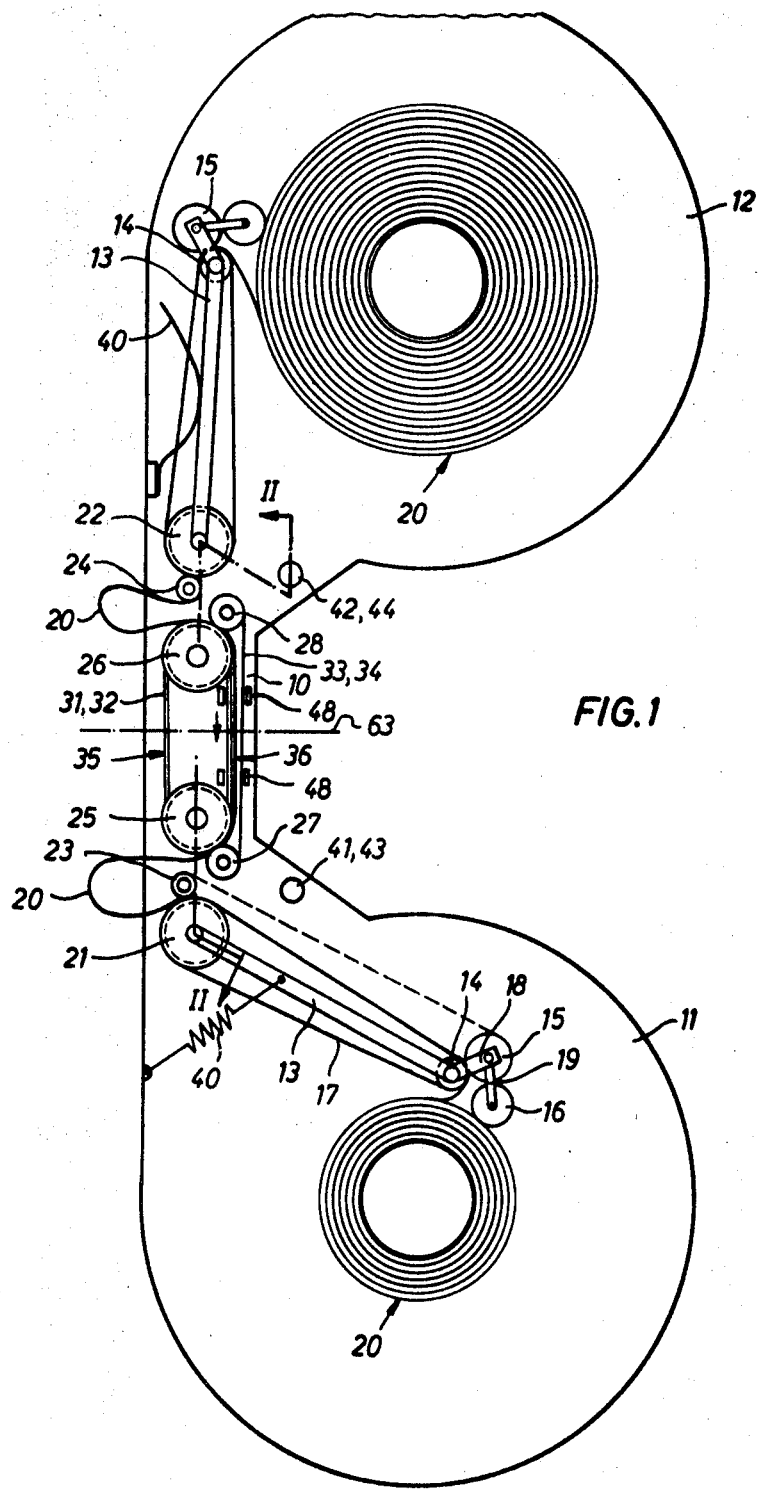
FIG. 1 is a side view of a cassette embodying the invention, in section.

A cassette for storing a film, including the associated sound track, has a baseplate 10 with two magazines 11, 12 to house the spools of film. The free ends of a film 20 are attached to the hubs of the spools.

The spools are driven by feed sprockets 21, 22 by way of respective levers 13, which can be pivoted coaxially relative to the sprockets 21, 22. At the free end of each lever 13 there is a roller 14, and two feed belts 17 are laid over the sprocket 21 and roller 14 or sprocket 22 and roller 14 respectively. These belts 17 transmit the rotational movement of the sprockets 21, 22 to a further roller 15 on an extension 18 forming an angle and being provided at the lever 13. A roller 16, on the free end of a rocking lever 19 coaxial with the roller 15, is in contact with the surface of the wound-on core of the film, a pinching effect being ensured by means of a spring 40 or the like. A continuous driving motion is therefore transmitted by the sprockets 21, 22 by way of the belt 17 to the roller 14, from this to the roller 15 and so by way of the roller 16 to the core of the film 20. Around each sprocket/roller system 21, 14 and 22, 14 there run two belts, supporting the two free edges of the film. These belts may bear teeth which engage the perforations in the film. The lever 13, 18, 19 is preferably in the form of a double lever comprising the sprockets 21, 22 and rollers 14–16.

Alternatively this arrangement may be used merely in order to ensure that the film 20 is wound onto the spool tightly. If so, the spool pivot is rotatably mounted and driven directly by the continuously rotating feed sprockets 21, 22.

Conveniently, however, the components 13–19, 29 and 40 are omitted, and the spool, which is freely rotatable in the cassette casing, has a hollow core. Into this core, before the projector is taken into service, an electric motor 111 may be inserted. This motor acts, for example, as a barrel engine and becomes operatively connected to the spool core as it is pushed into the core, and its rotor can be fixed to the magazine wall 10. The speed and direction of rotation can be controlled from the projector, according to the running speed of the film 20.

The continuously rotating feed sprockets 21, 22 are mounted on the cassette baseplate 10, as FIG. 1 shows. They engage freely rotating pinch rollers 23, 24, gripping the film between themselves and these rollers. Between the pairs of feed sprockets 21, 23 and 22, 24 there are two transfer sprockets 25, 26, driven by a maltese-cross-drive. The two sprockets 25, 26 are connected together by two endless transfer belts 31, 32, which run parallel to one another and bear on the margins of 78 and 20.

The dimensions of these transfer belts are such that they lie to each side of the optical projection axis 63, outside the picture area, in all operating positions of the cassette. Pinch rollers 27, 28 associated with the sprockets 25, 26 are situated on those sides of the sprockets 25, 26 remote from the projection axis 63 and are also connected together by two endless belts 33, 34 which run parallel to the belts 31, 32. The belts 31, 32 and 33, 34 are connected to one another over a flat area between the axes of the two sprockets 25, 26, enclosing the film 20 and holding it in a precisely determined position by means of toothlike projections 35 on the belts 31, 32, which engage in corresponding recesses 36 in the belts 33, 34.

The baseplate 10 is also provided with bearing bushings 41, 42, by means of which the cassette is slidably mounted on pins 43, 44 in a transverse direction, relative to the projection axis 63. The length of the pins 43, 44 is such that all the series of images disposed parallel one beside the other on the film 20 stored in the cassette may be brought into the optical projection axis 63. The pins 43, 44 are mounted on the projector 60 and/or an intermediate drive 80. In order to align the various series of images exactly relative to the optical projection axis 63, control means 45 with a plurality of positions is provided on the baseplate 10. This control means 45 may be in the form of a magnet, in which an armature may move backwards and forwards. There are as many positions as there are parallel series of images. A permanent magnet 46 at the free end of the armature engages a fixed surface 64 on the projector 60 or intermediate drive 80. Alternatively, other coupling elements for producing a positive connection may be substituted for the permanent magnet 46 and the corresponding surface 64.

Figure 2:
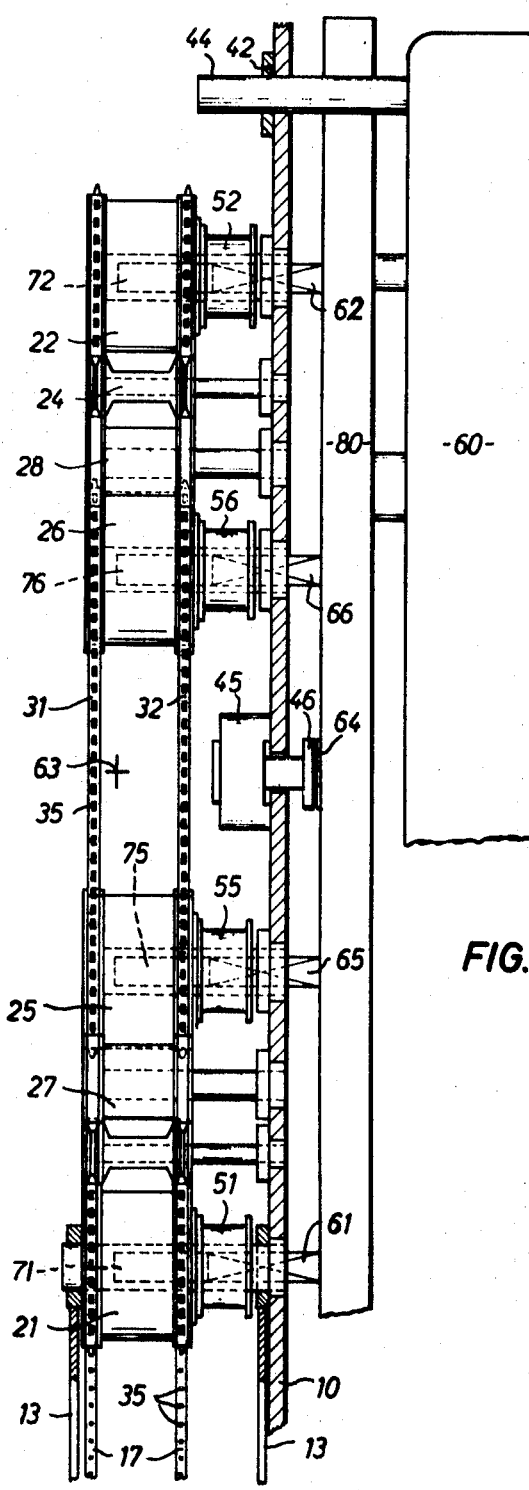
FIG. 2 shows a section taken along the line IIII in FIG. 1, on a larger scale.

In the described embodiment, the sprockets 21, 22, 25, 26 are situated at a distance from the baseplate 10 and rigidly connected to rollers 51, 52, 55, 56 which serve to guide and displace the magnetic tape forming the sound track. The magnetic tape has been omitted, for greater simplicity in FIG. 2.

The sprockets and rollers 21, 51; 22, 52; 25, 55 and 26, 56 are rotatably mounted on the plate 10, and each contains a central bore 71, 72, 75, 76. These bores are provided with coupling means transmitting torque from associated driven shaft pivots 61, 62, 65, 66 on the projector 60. These pivots are guided in the bores 71, 72, 75 76 in such a way that they slide easily in these bores, and they are long enough to remain in engagement with these bores in all operating positions of the cassette. Guide curves may be provided on the free ends of the pivots or bores so that the cassette can be put on the projector more easily.

When the transfer and feed sprockets are taken off a conventional projector, only a driving pivot for delivering the maltese-cross-motion remains. Therefore, an intermediate drive 80 is advantageously used, in order to provide a suitable transmission and distribution of the motion so that the cassette can also be used on conventional projectors. It is then merely necessary to make the pins 43, 44 correspondingly long.

Automatic projection of a film in accordance with this embodiment proceeds as follows. The film used has, for example, two parallel series of images. The film is stored in the cassette in such a way that at first the entire length of film is in the magazine 12, and the free end of the film is attached to the hub of the spool in magazine 11. An operator puts the cassette on a projector and operates a master switch, supplying current to the apparatus and starting the driving motor for the projector. The sprockets 21, 22, 25 and 26 are set in motion by the pivots 61, 62, 65, 66. If control processes (for example, switching off the lights in the auditorium) are to be initiated at the beginning of the performance, markings on the film 20 and/or sound track may operate a sensor 48 which initiates such control processes. Markings on the film or sound track are essential, however, shortly before the end of the first picture track, in order to operate the sensor 48 in such a way that the projector driving mechanism is halted and reversed. The control means 45 displaces the cassette so as to bring the new picture track into the optical projection axis 63, and the driving mechanism restarts in the opposite direction. If almost the entire second track has been projected, so that the film has returned to magazine 12, the sensor 48 can again initiate general control processes or—if the film carries a third and fourth series of images —it can, by shifting the cassette bring the latter into the operative position for the next portion of the performance.

It is of most importance with the invention that is possible to enclose all components in the cassette by means of a common casing, to protect the film 20 from external influences. In the embodiment described, it is assumed that a magnetic tape runs alongside the film and is brought in front of a sound head on the projector when the cassette is pushed in. Because the cassette is displaceable, it is possible to have as many sound tracks on a tape as there are series of images on the film. Optical sound tracks, also, can be scanned in the same way.

Figure 3:
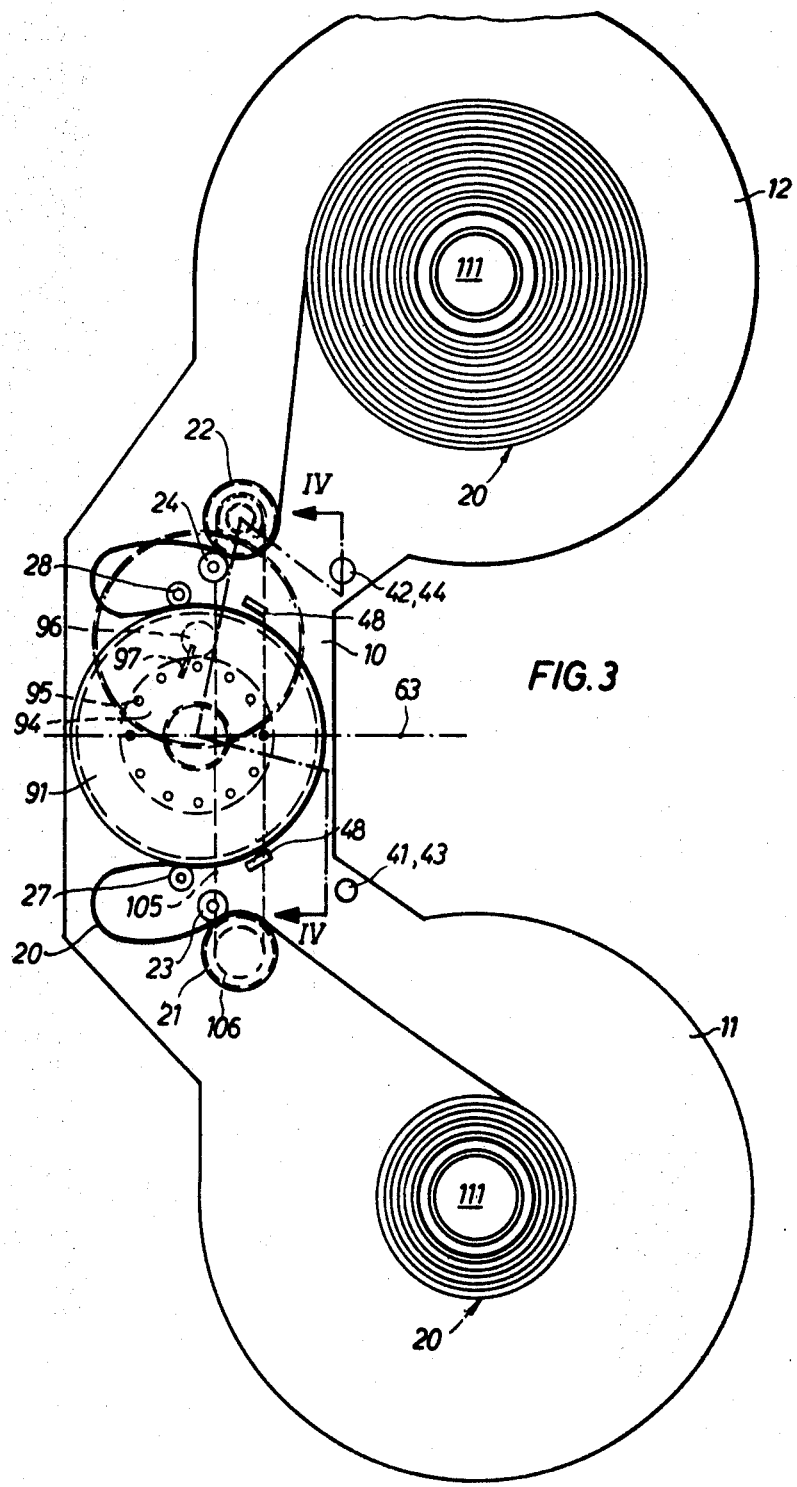
FIG. 3 shows another embodiment of the cassette, in section.
Figure 4:
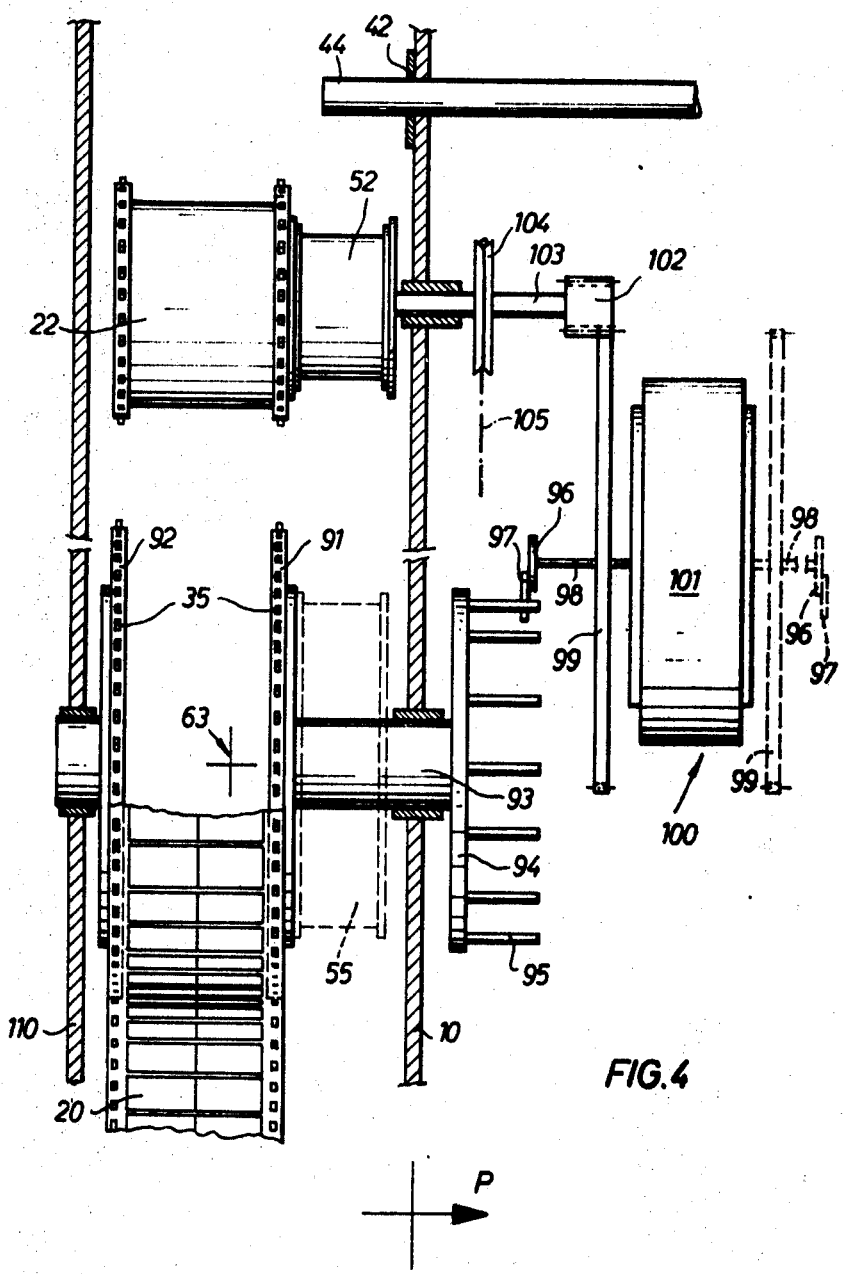
FIG. 4 is a partial view of a section taken along the line IV—IV in FIG. 3 on a larger scale, the pinch rollers being omitted.

FIGS. 3 and 4 illustrate another embodiment of the invention. Instead of the intermittently operating transfer system 25, 26 and 31–34 there are two transfer sprockets 91, 92 mutually parallel and coaxial and at some distance from one another. These transfer sprockets have the shape of a disc and toothlike projections 35 on the external rim of each disc by means of which they engage the perforations along the margins of the film 20. The two discs 91, 92 lie to each side of the optical axis 63 and are mounted independently of one another in the cassette walls. To this end, the disc 91 has a shaft 93, mounted in a freely rotatable fashion in the baseplate 10 of the cassette. The disc 92 is overhung in the other sidewall 110 of the cassette, this wall 110 being advantageously in the form of a cover which, after insertion of the film in the cassette, is put on to seal the interior of the cassette. The mounting of the covering wall 110 is such that the projections 35 on the sprocket 92 can simultaneously be pushed into the perforations in the margins of the film already inserted. The two sprockets 91, 92 are synchronized by means of the film 20 itself.

Outside the cassette, the shaft 93 bears a driving disc 94 with pins 95. These pins 95 are disposed axially, and their lengths are preferably such that when the cassette is displaced in the direction of an arrow P in order to bring another picture track into the projection axis 63, driving of the disc 94 by a plate 96 with entraining pins 97 is ensured. The angular interval between the pins 95 is selected according to the picture height and therefore determines the distance by which the film 20 advances. The pins 95 are driven by way of the cam plate 96, 97, in this embodiment simply a plate 96 with an entraining arm 97 which shifts the transfer sprockets 91, 92 one pin interval further for every revolution of the motor shaft 98.

This shaft 98 is associated with a motor 101 and bears a gear 99. This gear 99 meshes with another gear 102 on a shaft 103, which drives the feed sprockets 21, 22. The feed sprocket 22 is mounted directly on this shaft 103. In order to ensure that sprocket 21 is driven synchronously with sprocket 22, a reel 104 on the shaft 103 drives a V-belt, chain or other transmission element 105 connected to a corresponding wheel 106 on the shaft for a sprocket 21. The direction of film advance is changed by changing the direction of rotation of the motor 101, which, due to the form of the pins 95 and the gear 102, can still be transmitted to the components inside the cassette in the same way even if the cassette is displaced along the pins 43, 44 in the direction of the arrow P.

As shown by broken lines in FIG. 4, the motor 101 may also be provided with a shaft 98, gear 99 and cam plate 96, 97 on its other side. For this purpose each of the shafts 98 is preferably provided with a clutch being alternately engaged and disengaged. This drive renders the maltese-cross-drive, as used in the embodiment shown in FIGS. 1 and 2, superfluous and therefore much reduces the structural outlay. The drive 100 in FIG. 4 includes components 96 to 101 and is rigidly mounted on the instrument panel of the projector between the light source and the lens. Since the light source providing the optical projection axis 63 may easily be made displaceable, it can travel to and fro between the two sides of the drive 100. This motion is independent of the motion of the cassette on the pins 43, 44. The lens may be displaceable in front of the drive 100, according to the two fixed positions of the light source. Alternatively, and advantageously, two stationary lens systems are used.

There is no economic objection to having two lenses, but doing so reduces the requirements in respect of precision. Since, in the embodiment shown in FIGS. 3 and 4, the film 20 does not lie completely flat in the region of the optical projection axis 63, the lens system for this embodiment must be provided with a compensating lens.

The two embodiments may be interchanges, if desired. For example, as broken lines in FIG. 4 shown, the roller 55 (roller 56 is being omitted from this embodiment in any case) may also be mounted on the shaft 93, although the element may be situated somewhere else in the cassette instead.

The second embodiment, especially, ensures that a complete film program, with news, a supporting feature and a main feature, can be projected by means of a single projector. Control may be automatic, so that the starting and stopping of the whole program may be carried out by an operator remote from the projector, The projectionist, whose job, with conventional projectors, was solely to replace the reels of film and to bring a new film into action at the end of a finished film, become superfluous.

While in the foregoing specification I have set forth a specific structure in considerable detail, for the purpose of illustrating two embodiments of the invention, it will be understood that such details of structure may be varied widely by those skilled in the art without departing from the spirit of my invention.

I claim:

1. A cassette adapted for storing a perforated film having at least two mutually parallel series of images which can be reproduced in opposite directions of advance so that the film may be projected by a cinema projector comprising a casing having a plurality of connected walls, one of the walls comprising a base plate, means for aligning one of the series of images at a time with the optical projection axis of the projector, a plurality of magazines are carried by the baseplate on opposite sides of the projection axis with each of the magazines being adapted for receiving and storing said film, first sprocket means connected to said baseplate for advancing the film through the area of said projection axis, second sprocket means connected to said baseplate for feeding the film through the first sprocket means, at least one transfer sprocket means positioned between said first and second sprocket means, each said transfer sprocket means comprising parallel first and second discs spaced relative to one another, said discs having toothlike projections on their outer periphery for engagement in the perforations along the margins of the film and being mounted independently of each other to opposite cassette walls so that they are coaxially arranged and dimensioned as to lie to each side of the projection axis outside the image area of the film in all operative positions of the cassette, a shaft engaging said first disc, said shaft extending through said baseplate and having a driving disc at its free end outside the cassette casing wall.

2. A cassette as claimed in claim 1 wherein said aligning means is provided in said baseplate for engagement with corresponding supporting means on said projector.

3. A cassette as claimed in claim 1 wherein said means for aligning one of said series of images at a time with the optical projection axis of said projections comprises at least two bushings provided at said baseplate for engagement with at least two pins, said pins being connected to said projector, said cassette being slidably mounted on said pins by means of said bushings, the length of said pins being such that all the series of images on the film stored in the cassette can be brought into optical axis, said baseplate also being provided with control means, said control means engaging a fixed surface on said projector to simultaneously position the cassette and to fix the desired position of each series of images in said projection axis.

4. A cassette as claimed in claim 3 wherein said control means is a magnet having a plurality of predetermined positions.

5. A cassette as claimed in claim 3 wherein said control means engages a fixed surface on said projector by means of a permanent magnet.

6. A cassette as claimed in claim 1 wherein said driving disc has axially disposed pins secured thereto arranged at equal angular intervals and adapted to be actuated sequentially by a cam plate, said cam plate being connected to and driven by a continuously rotating motor having an adjustable rotatable speed, said motor simultaneously driving the second sprocket by suitable intermediate drive means.

7. A cassette as claimed in claim 6 wherein said motor is reversible and has two driving shafts with cam plates and a second sprocket drive.

8. A cassette as claimed in claim 1 wherein said magazines have spool cores inside, said spool cores being adapted to receive electric motors which can be pushed into the spool core to act as barrel engines, said barrel engines being attached to the magazine wall formed by said baseplate, said barrel engines alternately pulling the film in the direction of advance and tensioning the film on the spool.

9. A cassette as claimed in claim 1 wherein said first and second sprocket means are situated a predetermined distance from said baseplate and are rigidly connected to rollers for guiding a magnetic tape forming the sound track.

10. A cassette as claimed in claim 1 wherein said motor is reversible and has two driving shafts with cam plates and a second sprocket drive.